United States Patent
Weiss

(10) Patent No.: US 7,327,858 B2
(45) Date of Patent: Feb. 5, 2008

(54) SYSTEM AND A METHOD FOR PERSON'S IDENTITY AUTHENTICATION

(76) Inventor: Golan Weiss, 67/12 Ben Eliezer St., Ramat Gan 52290 (IL)

(*) Notice: Subject to any disclaimer, the term of this patent is extended or adjusted under 35 U.S.C. 154(b) by 541 days.

(21) Appl. No.: 10/467,654

(22) PCT Filed: Feb. 6, 2002

(86) PCT No.: PCT/IL02/00103

§ 371 (c)(1),
(2), (4) Date: Apr. 1, 2004

(87) PCT Pub. No.: WO02/065405

PCT Pub. Date: Aug. 22, 2002

(65) Prior Publication Data

US 2004/0151346 A1   Aug. 5, 2004

(30) Foreign Application Priority Data

Feb. 12, 2001 (IL) .................................. 141389

(51) Int. Cl.
*G06K 9/00* (2006.01)
*G06K 7/10* (2006.01)

(52) U.S. Cl. ............... 382/115; 382/126; 235/462.43; 235/454

(58) Field of Classification Search ............... 382/115, 382/313, 113, 312, 159, 155, 126; 235/472.01, 235/462.45, 455, 462.43, 462.23, 454; 358/296, 358/473; 345/163, 473; 347/105; 715/502
See application file for complete search history.

(56) References Cited

U.S. PATENT DOCUMENTS

| | | | |
|---|---|---|---|
| 3,581,282 A | 5/1971 | Altman | |
| 3,804,524 A * | 4/1974 | Jocoy et al. | 356/138 |
| 4,206,441 A | 6/1980 | Kondo | |
| 4,357,597 A | 11/1982 | Butler | |
| 5,073,950 A * | 12/1991 | Colbert et al. | 382/115 |
| 5,526,436 A | 6/1996 | Sekiya | |
| 5,528,355 A | 6/1996 | Maase et al. | |
| 5,708,497 A | 1/1998 | Fujieda | |
| 5,942,761 A * | 8/1999 | Tuli | 250/556 |
| 5,978,494 A * | 11/1999 | Zhang | 382/117 |
| 6,038,332 A | 3/2000 | Fishbine et al. | |
| 6,118,891 A | 9/2000 | Fonada | |
| 6,175,407 B1 | 1/2001 | Sartor | |
| 6,208,264 B1 * | 3/2001 | Bradney et al. | 340/5.2 |
| 6,298,445 B1 * | 10/2001 | Shostack et al. | 726/25 |
| 6,491,647 B1 * | 12/2002 | Bridger et al. | 600/585 |
| 6,819,219 B1 * | 11/2004 | Bolle et al. | 340/5.52 |
| 6,907,135 B2 * | 6/2005 | Gifford et al. | 382/117 |
| 6,970,584 B2 * | 11/2005 | O'Gorman et al. | 382/126 |

OTHER PUBLICATIONS

Pattern Recognition D.Zhang and W. Shu (Zhang et al. Pattern Recognition 32:691-702) pp. 695-702, Dec. 1997-Jul. 1998.

* cited by examiner

*Primary Examiner*—Sheela Chawan

(57) ABSTRACT

The invention relates to a method for biometric authentication of an individual based on the unique characteristics of his hand, using a scanning unit of any size. The invention also relates to a system for use of said method.

21 Claims, 8 Drawing Sheets

SYSTEM AND A METHOD FOR PERSON'S IDENTITY AUTHENTICATION

FIELD OF THE INVENTION

The present invention generally relates to the field of biometric authentication. More specifically, the present invention relates to a method for verification of a person's identity according to the unique characteristics of his hand, using a scanning unit of any size. The present invention also relates to a system for use of said method.

BACKGROUND OF THE INVENTION

Many resources have been invested into developing a reliable scheme for verification of an individual's identity in order to prevent fraud in the world of e-commerce. The single most common reason consumers cite for not carrying out purchases online is fear of credit card fraud. Similarly, the information revolution has created such an incredible ease of access to personal data, that the need for information security and for selective access permissions is acute. The industry buzzwords directed at the consumer are "anytime, anywhere," but not "anyone."

Methods that rely on something the user possesses, such as smart cards, or something that he knows, such as a password or personal information (for example an account number or birthday), are cumbersome and easily bypassed. Moreover, with the vast number of accounts an Internet user is likely to have (e-mail, e-banking, subscription Web sites, etc.), the number of passwords and PIN's he must remember becomes unbearable very quickly. For this reason much energy has been focused on the field of biometrics, or identification based on physiological and/or behavioral characteristics. Example of characteristics used for biometrics includes fingerprint, retina or iris scanning, voice, signature, and face. Biometric characteristics optimally do not change with time, do not require the user to remember anything, and cannot be lost or forgotten.

Finger and palm print scanning have been the subject of a number of previous patents (for example U.S. Pat. Nos. 6,118,891, 5,708,497, 5,528,355, 4,357,597, 4,206,441, 3,581,282) The use of both fingerprints and palm prints in the prior art has a significant shortcoming in that the data is completely static. In this regard the individual is better off using a credit card number, because if his credit card number is stolen he can get a new credit card; if his fingerprint data is stolen, he can no longer use the system. A similar problem exists in determining whether the print being scanned into the system is coming from a live person and not merely a picture. Methods of the prior art for testing this include heat sensors and pulse detectors, and are easily defeated.

As regards the use of palm prints, a further disadvantage of the prior art is the need for a scanner specially designed for the purpose of scanning the palm (see U.S. Pat. No. 5,528,355), or positioning and actuating mechanism (see U.S. Pat. No. 4,357,597). Specially designed scanners intended specifically for scanning of the palm, such as U.S. Pat. No. 5,528,355, were invented to deal with the loss of data due to the convex form of the heel of the palm.

Other methods of scanning the palm according to the prior art also require scanning at high resolutions (600-1200 DPI), necessitating scan times of upwards of one minute, a length of time for which no subject can be reasonably to expected to hold his hand still. Biometric identification according to such methods involves first manually taking the subject's palm print using ink, and then scanning the ink print, such as the method described by D. Zhang and W. Shu (Zhang et. Al, Pattern Recognition. 32:691-702). This method of taking an image of the palm is messy, and requires professional skill to get a print of acceptable quality for identification purposes.

Surprisingly, the present invention overcomes the aforementioned shortcomings, and allows for quick, easy, and secure authentication by means of a scanning unit.

SUMMARY OF THE INVENTION

The present invention relates to biometric authentication and more specifically to a system and a method of authenticating individuals according to their hand print, as scanned by a scanning unit. The "scanning unit" may be a conventional flatbed scanner, or to a flatbed scanner having at least one additional CCD (charged couple device)-based optic device (any device that absorbs light with light sensing photoelectric devices such as a digital camera, video camera, or Web camera), or a scanner-like device including a CCD-based optic device and a transparent, planar, surface but not including the scanning mechanism of traditional flatbed scanner. In preferred embodiments in which the scanning unit includes both the scanning mechanism and the CCD optic device, the unit can work in two modes, one based on scanning via the scanning mechanism, and the other based on scanning via the CCD optic device. "Authentication" (also known as verification") refers to a one-to-one comparison to determine that an individual is who he claims to be. Identification refers to a one-to-many comparison to determine the identity of an individual. Identification is required by law enforcement, where there is a need to determine the identity of a criminal with no prior claims regarding his identity. The field of e-commerce and other remote transactions, as well as regulation of access to high-security areas and data, demands only authentication, as the purchaser will always identify himself before initiating a transaction, leaving it up to the security mechanisms to only authenticate this identity. In the context of the present invention, the term "computer" is meant to refer to any CPU-based computing device (microcontroller etc). In some preferred embodiments, the computer is embedded within the scanning unit itself.

The method and system according to the present invention are the first ever to use a scanning unit having a transparent planar platen to effectively perform biometric authentication of an individual by directly scanning said individual's hand. For the purposes of this invention, said individual will be referred to as "the user."

In its preferred embodiment, the method according to the present invention is performed in response by a request from the user to make a purchase or financial transaction using a credit card over the Internet, but this should not be construed to limit the many applications of this method. The invention is applicable for any access control system, such as computer access, ATM's, point of sale, network access, or any application requiring authentication of the identity of an individual. In the method according to the present invention, the identity which the user claims to possess is already known, according to methods known to those skilled in the art. The method provides for 100% reliable authentication of the person's identity.

At the first stage of the method, a server software, running either remotely or locally to the user, sends a set of instructions to the user instructing him how to position his hand on the scanning unit. Said set of instructions to the user can be as simple as the single instruction to freely position his hand on the scanner surface. The present invention also allows for instructions to include any combination of the angle at which his hand should be positioned; which fingers should be together and which apart, and optionally the distances between his fingers; to which fingers, if any, he should apply pressure; and the general area of the scanning unit on which he should place his hand. The fact that this set of instructions varies between authentications provides a check that the imaged obtained is from a live hand, and not from a fraudulent use of images previously scanned, photographed, or otherwise obtained.

It should further be noted that unlike methods of the prior art, the present invention does not require the use of any positioning and actuating mechanism or device.

The user then places his hand on the scanning unit according to said instructions, and the scanning unit scans the user's hand. A client software local to the user collects the data from the scan, according to methods known to those skilled in the art. In particular, the area of the hand scanned by the scanning unit includes the palm and the underside of the fingers, or any subset of this area. The direct scanning of the hand by the scanning unit, without the aid of any additional devices, is a significant improvement over the prior art, which required special scanners, positioning and actuating mechanisms, and/or taking an ink print of the user's hand (following which the print is scanned and not the hand itself).

In the preferred embodiment of the method according to the present invention, the server software controls the scanning unit, including instructing it which portion of the total scannable area to scan, and at what resolution.

Said client software then sends to said server software the user's collected hand data or a mathematical representation thereof. All communication between the server and client is encrypted using methods known to those skilled in the art.

Said client software can either send to said server software said collected hand data in its raw form, or it can send a processed mathematical representation of this data. Said client software can either send to said server software the entire sample of said currently collected hand data or said processed mathematical representation, or only send data or its representation of a random section of the hand, according to the server's request. This is what is referred to by those skilled in the art as the use of a "one-time key." Even if a hacker manages to decrypt the communication between said client software and said server software, he will only obtain a partial image of the user's hand. On the next authentication said server software will expect to receive a different portion of the total data, and the data the hacker stole last time will be useless. The odds that a hacker would be able to accumulate enough data to extrapolate an image of said user's entire hand is extremely slim. Additionally, on the next authentication the server software will send a different set of instructions for the user to follow, and accordingly expect a different set of data, further rendering useless pirated data obtained by a hacker attempting to fraud the system.

When said server software has received said user's currently collected data from said client software, it compares said user's currently collected hand data to hand data previously collected from the individual the user claims to be. The previously collected hand data is stored in a database of hand data which may be either local or remote to the both user and the server software. Said comparison of said user's currently collected hand data to hand data previously collected from the individual the user claims includes the comparison of three biometric parameters, any one of which would be insufficient to achieve a high level of accuracy, but because the three are orthogonal, in tandem produce the excellent results which allow the method according to the present invention to succeed. These three parameters are the contour of the hand, the distance between the prominent lines of the fingers, and the form of the prominent lines of the hand. It should be noted that the present invention is the first to make use of this combination of parameters for authentication, and in particular is the first to use the prominent lines of the fingers as a parameter for biometric authentication. A numerical score is obtained based on the comparison of each parameter, and the separate scores are combined to form a super-score indicating whether a match exists between the user's currently collected data and the hand data previously collected from the individual the user claims to be, in other words whether the user is in fact this individual.

The above steps can be repeated any number of times, according to the security demands of the application of the present invention. Repeating these steps provides further guarantee that the images obtained are from a live hand, as a differing set of instructions will be issued on each step, requiring a different positioning of the hand. This would be nearly impossible to forge by scanning "non-alive" static images.

At the end of the method according to the present invention, said server software either authenticates or rejects the user as the individual he claims to be.

The method clearly necessitates the existence of authenticated biometric data on each user before the method starts. This is obtained in a process called "enrollment," in which each potential user of the method enters the necessary biometric data into a database for storing collected hand data. In the enrollment process, the server software asks the user to place his hand on the scanning unit, and scans the entire underside of the user's hand. The client software collects the data from the scan, and sends either it or a processed mathematical representation of it to the server software. This data is stored in the database until it is needed in the authentication method.

The system according to the present invention consists of a scanning unit, an end terminal computer running a client software which has control over the scanner, a server software which is responsible for administration of the authentication process, and a database for storing collected hand data. Said end terminal computer running a client software which has control over the scanning unit, said server software which is responsible for administration of the authentication process, and said database for storing collected hand data, can be situated either locally or remotely to with respect to one another. In some embodiments, the server and the client may be located on the same computing device.

DETAILED DESCRIPTION OF THE PREFERRED EMBODIMENTS

FIGS. 1-9 describe the method of the present invention and make reference to a preferred embodiment of the present invention, in which the user makes use of a standard personal computer, with a flatbed scanner attached to it, and running the client software. It is appreciated that the invention can work with any scanning unit having a transparent planar platen, and a scanning mechanism and/or a CCD optic device, (as shown in FIG. 10) and not only with a flatbed scanner. In the embodiment illustrated in FIG. 9, the server software and the database which stores the collected hand data are located remotely, and all three are connected by means of the Internet.

A preferred application of the method according to the present invention is an online purchase using a credit card, such as Visa. Before the user can be authenticated using the system and method according to the present invention, he must first enroll.

It will be of great help to the understanding of this patent if a couple of the more technical modules in the method according to the present invention will be explained first, and then shown in their place in the method according to the present invention.

Module (A): The image-processing module. This is the module used to process the image obtained from a scan of the user's hand. In the preferred embodiment of the present invention the image-processing module is part of the client software.

Figure 1:
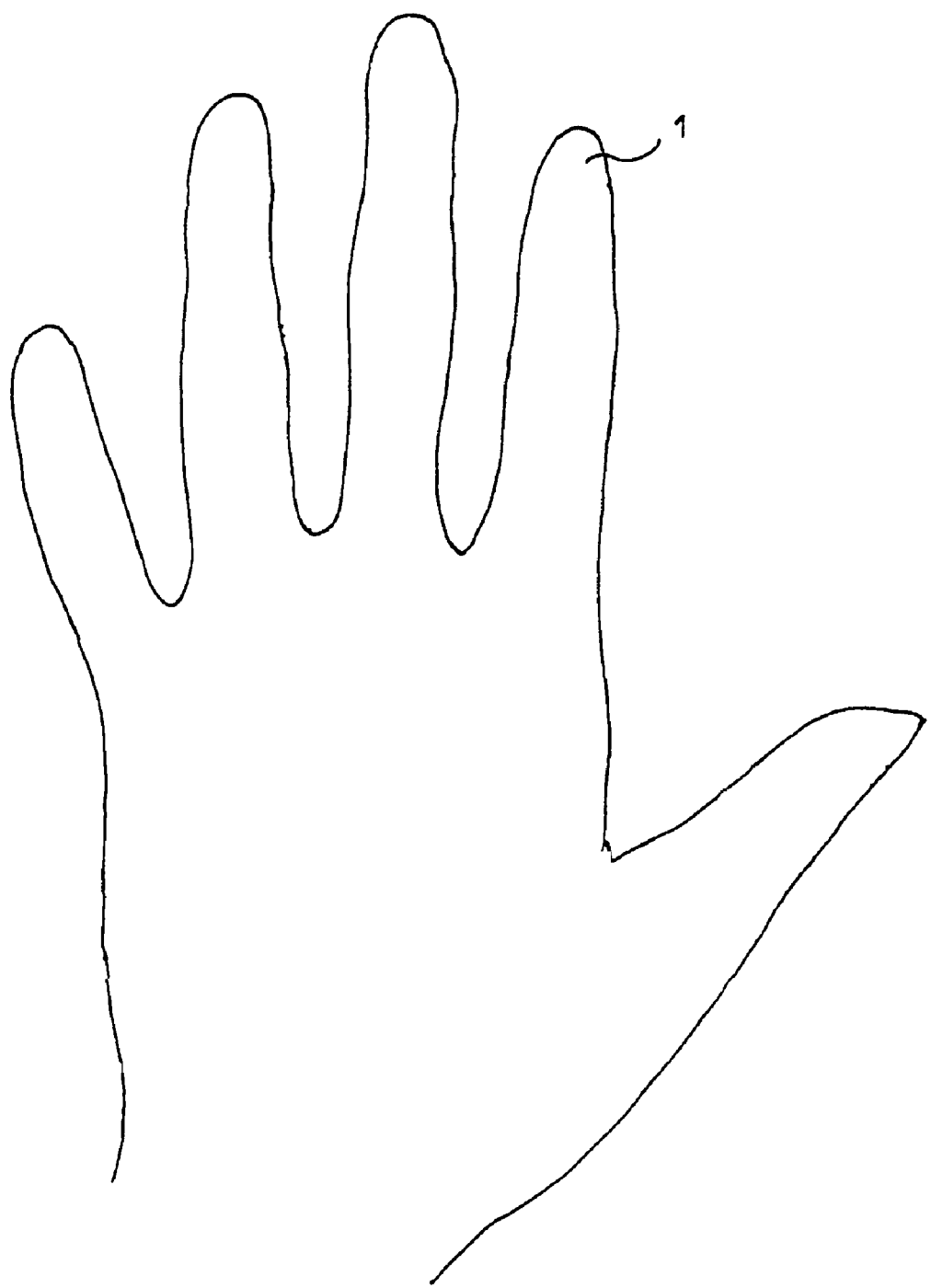
FIG. 1 is a view of the contour of the user's hand, as gleaned by the image-processing module.

This module is used in both the enrollment and the authentication. In the first step, the outline of the hand 1 is detected using either the difference between the color balances of the hand and the background, in the case of color scanning, or by an edge detection algorithm in the case of black-and-white scanning. In the case of color scanning, a green background is used above the hand for improved contrast. Such methods for outline detection are known to those skilled in the art. FIG. 1 shows a sample of an outline obtained from a user's hand 1. Based on the outline 1, the image-processing module also gleans information pertaining to the manner in which the user placed his hand on the scanner, used to determine whether the user followed the instructions of the server software.

The image of the hand is then binarized, and image correction is performed. This correction consists of filling in all the holes in the hand image and filtering out noise in the image. When the image correction is completed, said outline of the hand is represented by use of chain codes, according to methods known to those skilled in the art.

Figure 2:
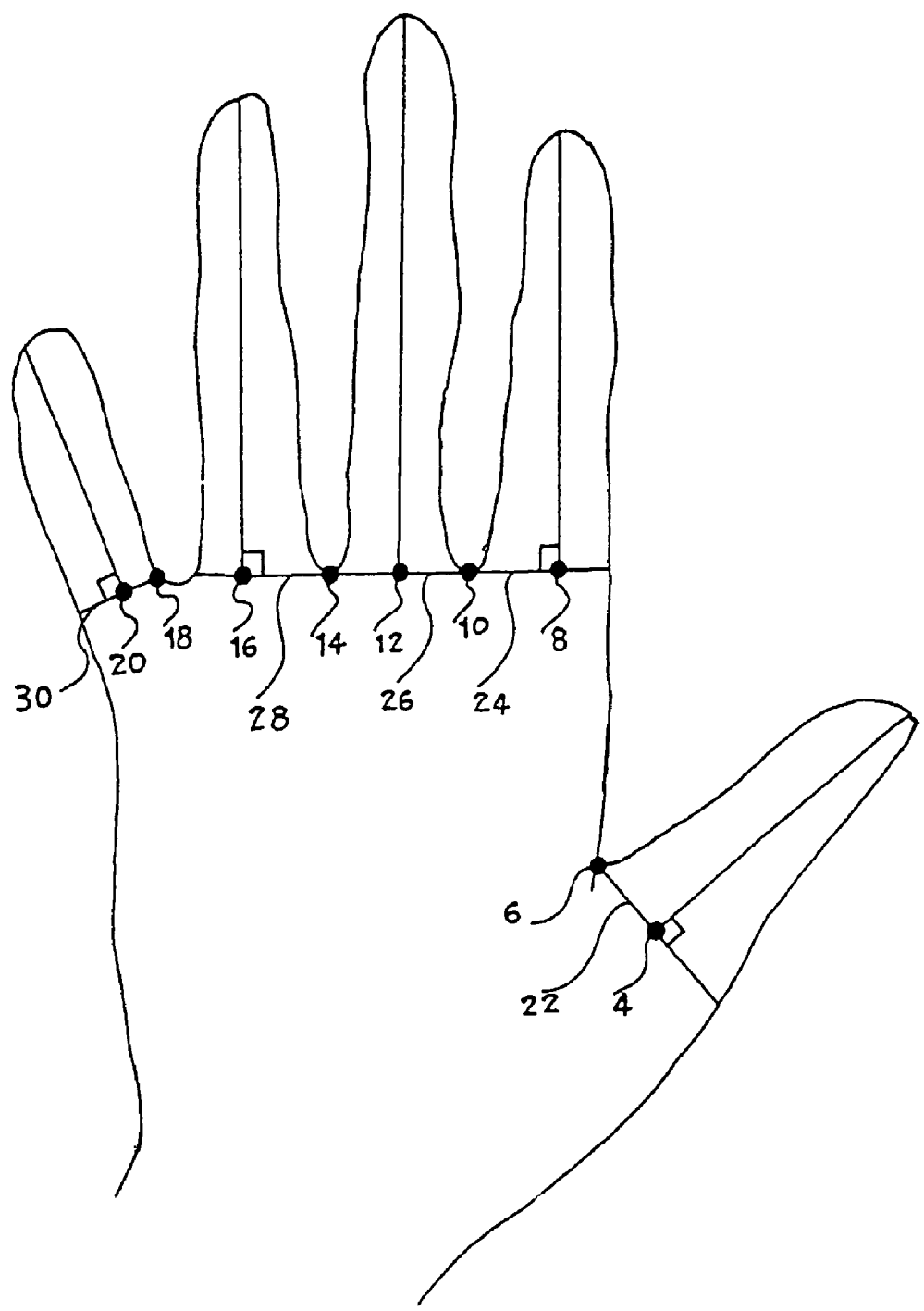
FIG. 2 illustrates the reference points according to the image-processing module, and the lines according to which the fingers will be segmented.

The next step is to find reference points for the hand. The reference points are the points whose location can be consistently represented relative to the various segments of the hand, regardless of how the hand is positioned. When comparing data from hand images obtained at different times and using different positions of the hand, the reference points enable the generation of a common system of coordinates according to which comparison can be made. Referring to FIG. 2 the reference points are the local minimum points between adjacent fingers 6, 10, 14, and 18, and the median lower points of the fingers 4, 8, 12, 16, and 20.

Using the reference points 4-20, the hand image is then broken into six segments, or the five fingers and the palm without the fingers. The finger segments are divided from the palm according to lines 22-30. Lines 26 and 28 are the Lines connecting the two local minimum reference points on either side of the finger. For fingers with only one adjacent local minimum reference point, the lower border of the finger segment 22, 24, and 30 is the perpendicular line connecting that point to the median line of the finger.

Figure 3:
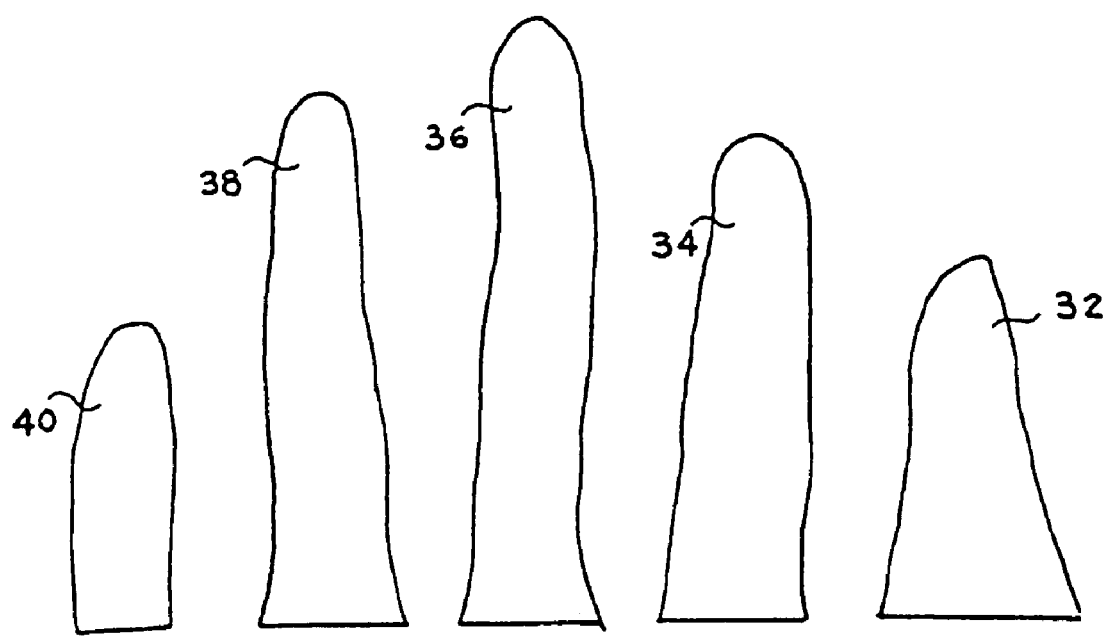
FIG. 3 illustrates the division of the hand into five finger segments and palm segments, the finger segments being shown in canonic position.
Figure 3:
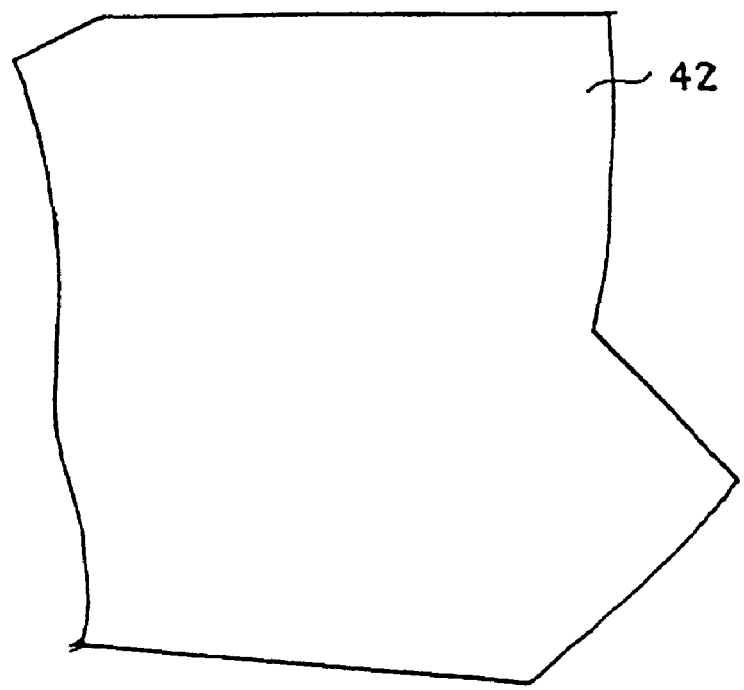

Each segment is then transformed to its canonic position. The canonic position is defined as the position in which the major axis of ellipse (as defined by the MATLAB image-processing toolbox) of the finger is parallel to the vertical axis of the coordinate system. FIG. 3 shows the resulting six different segments, with the finger segments 32-40 in their canonic positions.

Figure 6:
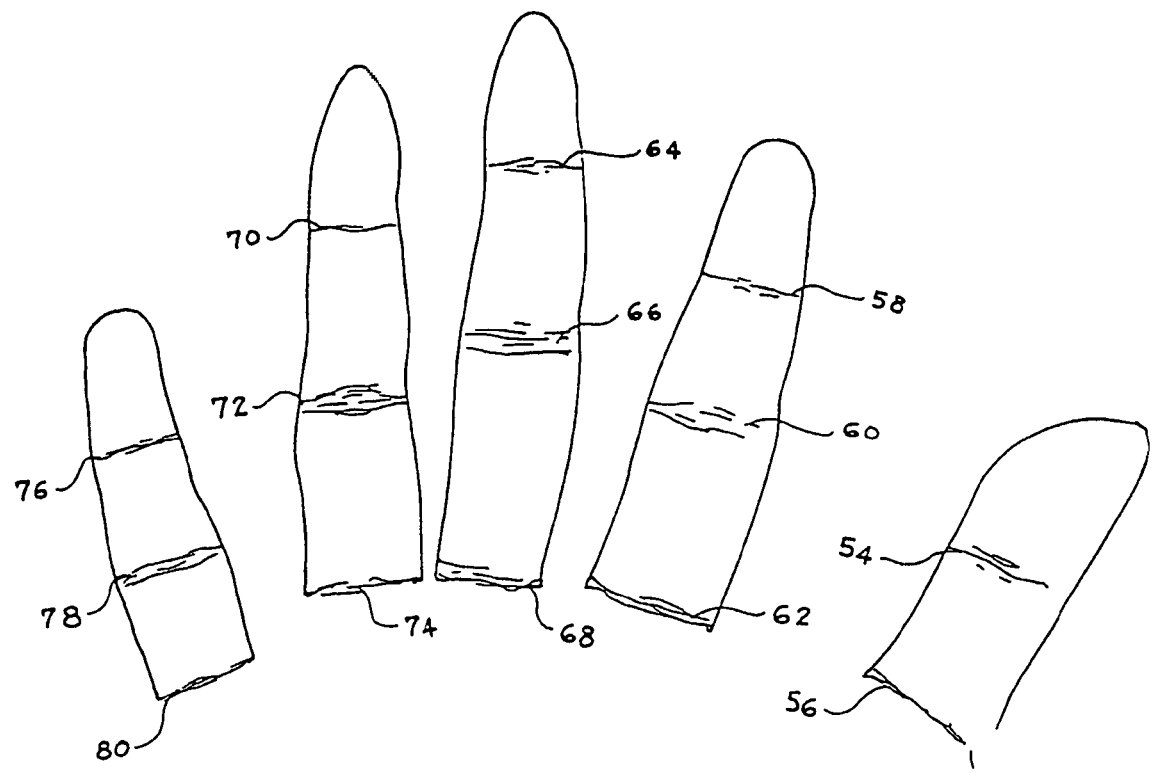
FIG. 6 illustrates the image-processing of the prominent lines of the fingers.

Referring to FIG. 6, for each finger segment 32-40 the image-processing module detects prominent lines of the fingers 56-80 (the deep lines underneath finger joints) using an edge detection algorithm. Such edge detection algorithms are known to those skilled in the art. The data for these 14 lines is stored as the distance between any line and the line above it, or between the line and the upper midpoint of the finger.

Figure 7:
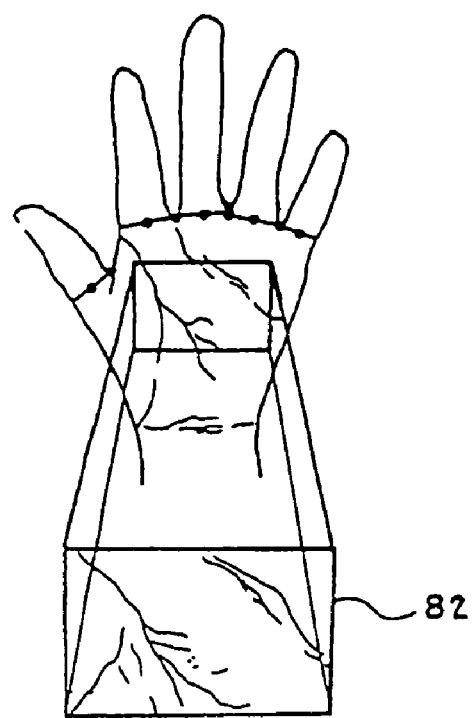
FIG. 7 illustrates the cropping of a random portion of the palm.

The next step is detection of the prominent lines of the palm. This is the only step which differs between the enrollment and authentications phases. In enrollment, the entire palm image is processed for prominent line detection. In the authentication phase a random portion 82 of the total image of the palm is cropped according to the instructions given by the server software. The cropping is done according to the reference points already calculated. FIG. 7 illustrates the cropping of the palm. The detection of the prominent lines of the palm is then done in the same manner as in the enrollment phase, on the cropped portion 82 of the hand only.

Figure 8:
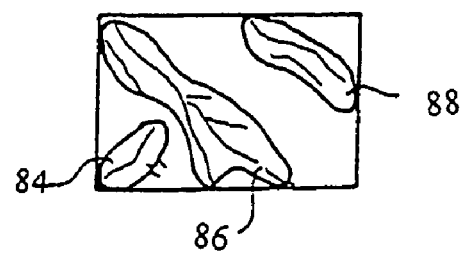
FIG. 8 illustrates the image-processing of the prominent lines of the palm in the region cropped in FIG. 7.

Prominent lines are defined as lines meeting predefined criteria for length and width. Standard edge detection algorithms, known to those skilled in the art, are used to detect lines on the palm. Short, lesser lines, whose data may not be accurate anyway due to the simple, low resolution scan performed in the present invention, are thus filtered out and ignored. An aperture of a predefined width is then built around each of the prominent lines detected. Referring to FIG. 8, which illustrates the detection of the prominent lines on the cropped portion 82, each continuous area formed by connecting areas of individual prominent lines and their respective apertures, is stored as a contour 84-88, the control set for comparison of the prominent lines of the palm being the union of all of these contours 84-88.

Module (B): The biometric data comparison module. This is the module which is the core of the authentication. It compares hand data collected on authentication with hand data previously collected at enrollment to see whether they belong to the same individual.

There are three steps to the biometric data comparison module: comparison of the contour of each segment, comparison of the prominent lines on the fingers, and comparison of the prominent lines on the palm in the random portion of the hand.

The detailed shape comparison method of the segment/s contours and the prominent lines could additionally apply any other shape comparison algorithm known to those skilled in the art (with or without finger/s or prominent lines rotation).

Figure 4:
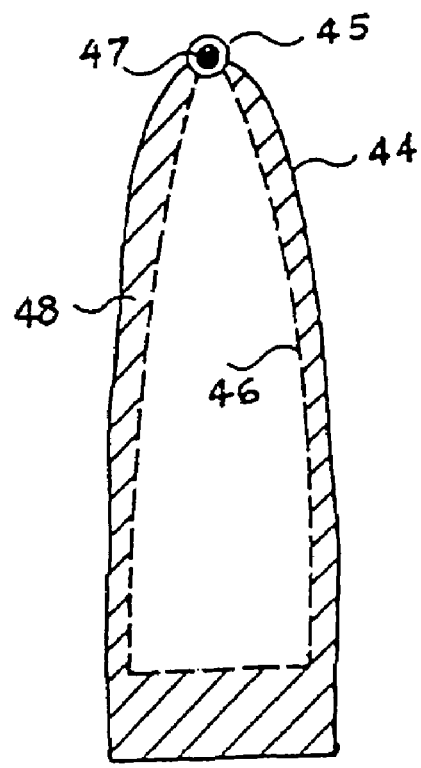
FIGS. 4 and 5 illustrate the comparison of the contours of the finger segments.
Figure 5:
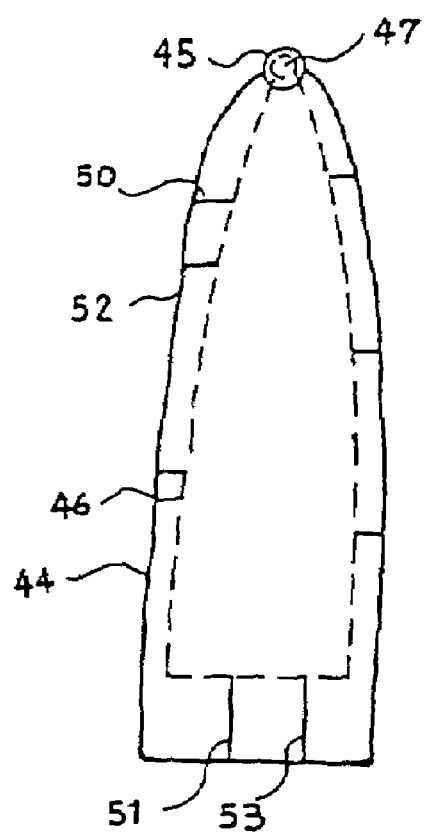

For the comparison of the contours of the finger segments, the finger segments are first transformed to canonic position, as described in module (A). Referring to FIG. 4, for each finger of the hand, the corresponding segment contours from the enrolled hand and the hand being authenticated 44 and 46 are placed on top of each other, by overlapping the upper midpoints 45 and 47 of the two contours. A pair of scores (A, D) is calculated for each finger segment on the hand being authenticated, where A is the area of the complement set of the segment contours 48 and D is the standard deviation of the distances between corresponding points on the respective segment contours. Referring to FIG. 5, the distance between corresponding points is defined as the length of the horizontal line 50 and 52 between the two contours, at a constant vertical coordinate, along the sides of the short finger, and as the length of the vertical line 51 and 53 between the two contours, at a constant horizontal coordinate, along the bottom of the shorter finger. When all five fingers have been compared, a set of values A1 through A5 and D1 through D5 have been created, where each value An and Dn refers to a particular A and D value for a given finger.

The comparison of the prominent lines on the fingers is next. The client software sends the server software the distances for each of the 14 prominent lines of the fingers 56-80 on the hand being authenticated, as calculated in module (A). The server software compares these distances to the corresponding distances on the enrolled hand. This creates a set of values d1 through d14, where each value dn is the difference between the two data sets of the distance for the respective prominent line of the finger.

For the comparison of the prominent lines of the palm, the client software sends the server software a set of points corresponding to the contours 84-88 of the prominent lines in the portion of the palm being compared. The server software will compare this set of points to the set of points of the corresponding portion of the control set extracted from the enrolled hand. This method of comparison of the prominent lines of the palm is according to the known method of D. Zhang and W. Shu (Zhang et. Al, Pattern Recognition. 32:691-702). According to this comparison a score r is calculated, where r is a ratio of the area of the control set to the number of points in the hand being authenticated that are contained in the control set.

The final score is a weighted composite of the previously calculated score, according to the equation:

$$C = m1r + m2(A1+A2+\ldots A5) + m3(D1+D2+\ldots D5) + m4(d1+d2+\ldots +d14),$$

where m1, m2, m3, and m4 are the weights for each parameter's score, and m1>m2>m3>m4. If the score C is less than a predefined threshold T, the server software accepts the hand being authenticated as being the same as the enrolled hand. This threshold T can be manipulated according to the security settings required by a given application of the method according to the present invention. If the score C is equal to or greater than the threshold T, the server software rejects the hand being authenticated as being the same as the enrolled hand.

The enrollment in the preferred embodiment is as follows.

The user, through methods known to those skilled in the art, requests to enroll from the server software. As part of this request the user supplies a user ID provided to him by the credit card company. The server software is provided with prior knowledge of all of the user ID's distributed by the credit card company. If the server software recognizes this user ID, and this user ID does not already have enrollment data corresponding to it in the database, the user will start the enrollment process. If the above conditions are not filled, the user will be asked to re-enter his user ID.

At the first stage in the enrollment process, the user places his hand palm-down on the flatbed scanner, and the entire image of his hand is scanned. Said image of his hand is then processed by said image-processing module (A) of the client software, and the data is sent to the server software. The server software enters the user's hand data into the hand data database, and notifies the user that he has been successfully enrolled. The user can now use the present invention for authentication.

The prime example for when the user will use the present invention for authentication is when the user requests to make an online purchase using his credit card. In response, the web site on which the user is attempting to make a purchase asks the user to go through the authentication phase of the method according to the present invention. The user enters his user ID to the system, and if he is already enrolled, will progress to the next step in the authentication. If he has not enrolled, he will be told that he must enroll before using the authentication phase.

If he has enrolled, the server software sends the user a set of instructions for how to position his hand. These instructions include which hand to use; at what angle relative to the scanner to place his hand; whether to open or close his fingers; to which fingers, if any, he should apply pressure; which general area of the scanner to place his hand. The server software sends instructions to the client software telling it which portion of the palm to scan, and which random portion of the palm should be cropped for comparison of the prominent lines of the palm. The user places his hand on the scanner according to the instructions he received from the server software, and the client software scans the hand and collects the data according to the instructions it received from the server software.

A time-out parameter can be set such that if too long of a period elapses between the reception of the instruction and the scan, the user will be rejected. This, combined with the randomized instructions, is excellent protection against a hacker using photographs of the user's hand to forge the user's identity. The hacker would have to be equipped with dozens of pictures, each in a different position, and even if he could achieve this feat, he would have to be able to pull out the appropriate one and correctly position it on the scanner in the time given.

If a scan is made in the time allowed, the client software processes the image according to the image-processing module, module (A). The client software then encrypts and sends the biometric data and the data pertaining to the manner in which the user placed his hand on the scanner to the server software. The server checks whether the user placed his hand according to the instructions he received, using methods known to those skilled in the art. If the server software finds that the user's hand was not placed according to the instructions, the user is rejected. The server software determines whether the user placed his hand according to the instructions based on data extracted in the image-processing module (A), and using methods known to those skilled in the art.

If the server software determines that the user did place his hand on the scanner according to the instructions, it will then progress to the biometric data comparison module (B). If the server software determines that the hand being authenticated is the same is the enrolled hand, it will notify the user that his identity has been successfully verified and he may carry out the desired purchase. If the server software determines that the two hands are not the same, it will reject the user.

If the user is rejected, he can optionally be given the option of trying to be authenticated for his user ID again. An option can also be defined such that after a certain number of unsuccessful retries made on a given user ID, that user ID will be blocked.

An alternative embodiment allows the system to be set at a higher security mode in which it will require the user to go through the above authentication stage more than once, to provide extra protection against false acceptances.

Figure 9:
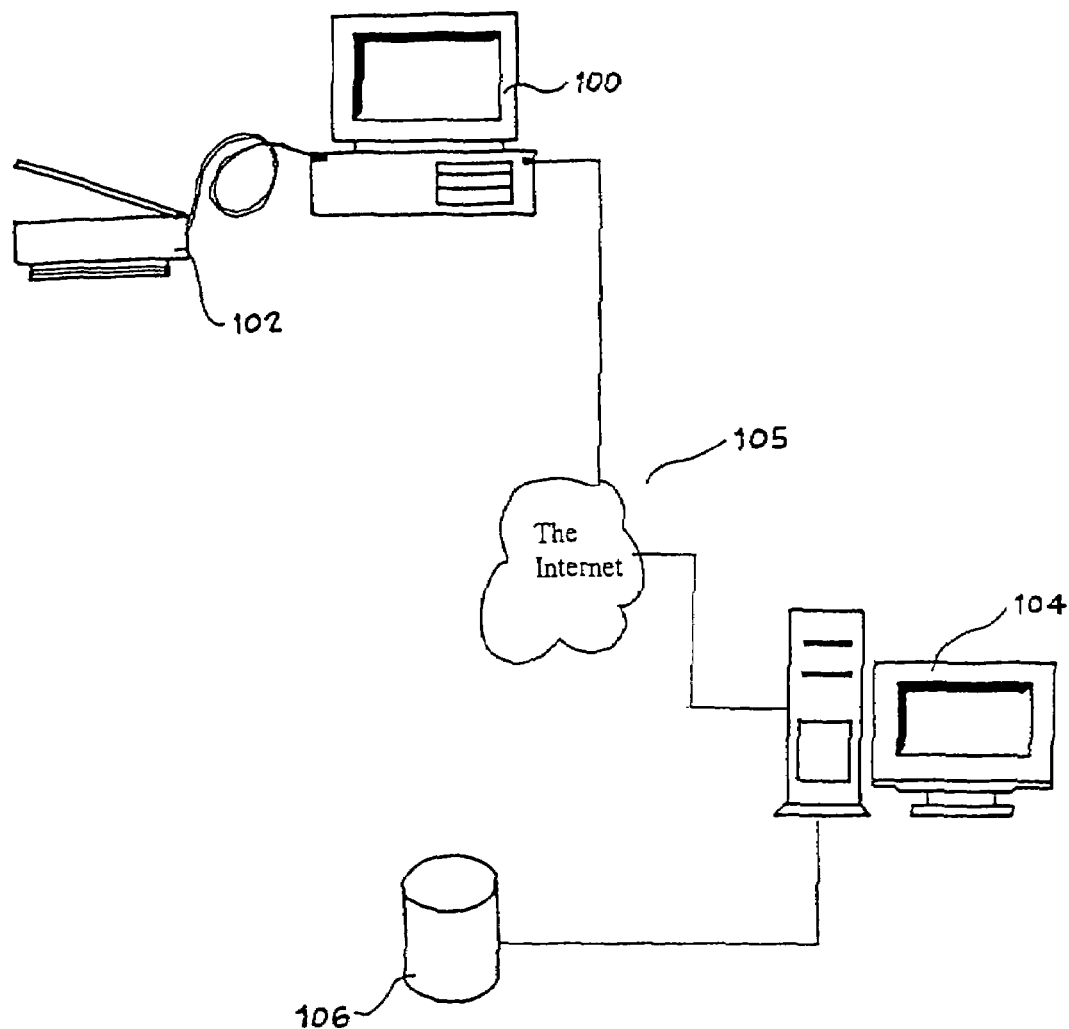
FIG. 9 illustrates the system for using the method according to a preferred embodiment of the present invention.
Figure 10:
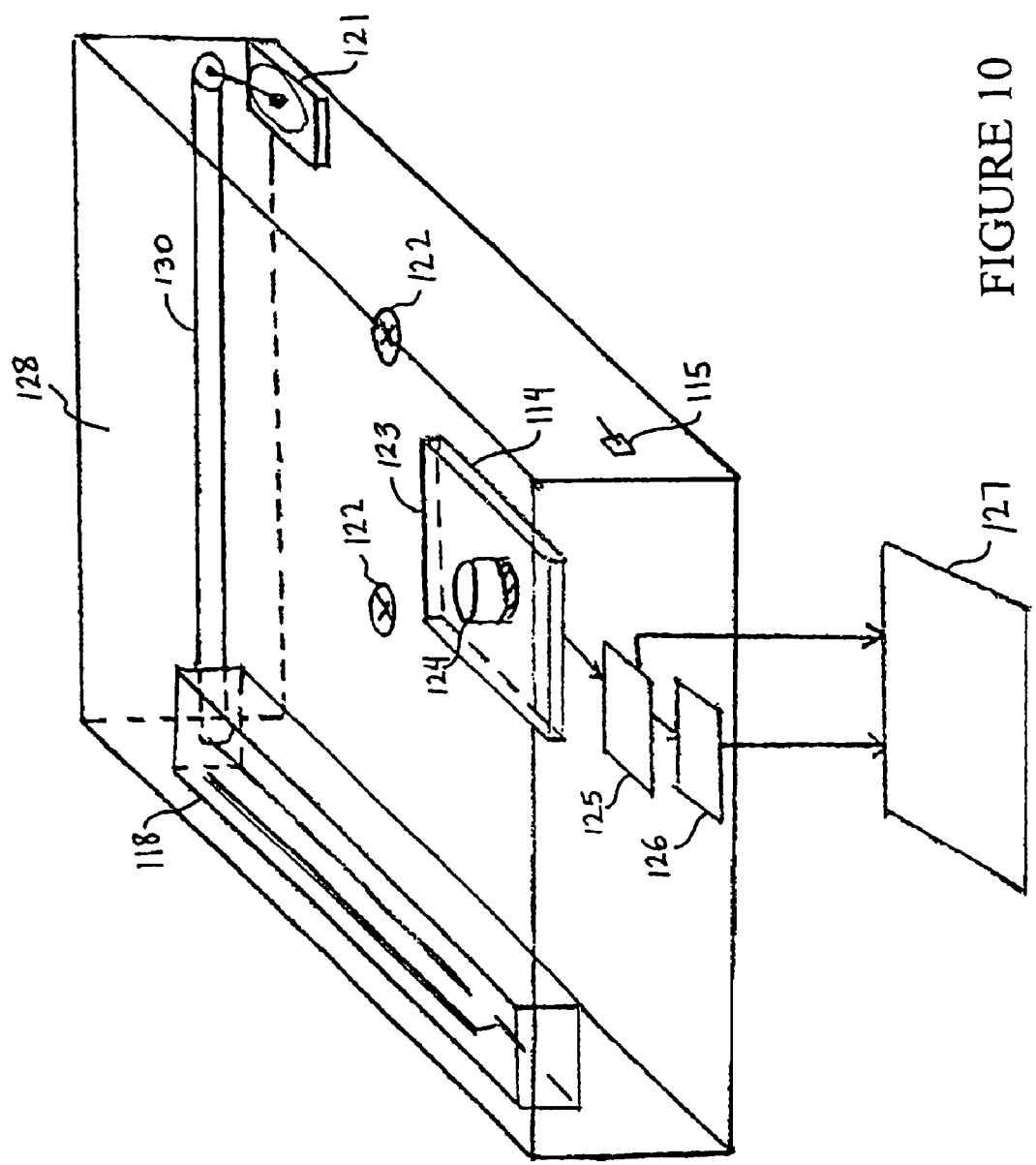
FIG. 10 illustrates a schematic view of a scanning unit, according to certain preferred embodiments of the present invention.

FIG. 9 shows a networking diagram of the system for using the method according to the present invention. The home computer running the scanner software 100 is local to the scanner 102, and connected over the Internet 105 to a server running the server software 104, which is locally connected to a database containing the hand data 106.

Reference will now be made to FIG. 10. In some preferred embodiments, the scanning unit is a conventional flatbed scanner. In other preferred embodiments, the scanning unit has the same general shape of a conventional flatbed scanner, with a transparent planar platen (128) for placement of the hand of an individual, but not including the scanning mechanism (118). In this preferred embodiment, a mirror or prism, may be included, as known in the art, to facilitate obtaining of the appropriate imaging of the palm via the CCD optic device.

In yet other preferred embodiments, the scanning unit includes both the scanning mechanism (118) used in conventional flatbed scanner and a CCD-based optic device (114), both of which can be used to scan the image of the hand, according to the method described above. This preferred embodiment is illustrated in FIG. 10, which will now be described. The scanning unit has two modes, scanning using the scanning mechanism or using the optic device, both of which offer minimal scanning time, since a low resolution is needed. In the mode in which scanning is conducted by the optic device, the whole palm image is scanned at once, thereby reducing the scan time to a fraction of a second. This embodiment is especially useful for access control applications, in which very fast scanning is required. The user can switch between the two modes via a switch (115). It is appreciated that because of the unique biometric authentication method used in the present invention, it is possible to use a planar surface for scanning whereas in the prior art, it was impossible to achieve such a high level of efficiency and accuracy using a flat scanning surface.

In the preferred embodiment illustrated, the scanning unit includes a motor (121) coupled via a shaft (130) to the scanning mechanism (118) for powering said scanning mechanism (118), a plurality of light sources (122), a CCD sensor array (123) and a lens (124) that are part of the optic device (114), an analog-to-digital converter (125), a logic board (126), and a computing device (127).

The user chooses in which mode the scanning unit should function. In the mode using the CCD optic device, the hand is first placed on the transparent planar platen (128) of the scanning unit. The computing device (127) sends instructions to the optic device (114) (through the logic board (126) or directly to the control unit of the optic device). The light sources then shines light on the platen (128). The light strikes the hand image, and light is then reflected to the lens (124) of the optic device directly or by a mirror or prism. The CCD sensor array (123) measures the amount of light reflected at each point of the image and converts the light to an analog signal. The analog signal is converted to a digital signal by the converter (125). Data is then transferred to the computing device (127) via the logic board (126) or directly. In the mode using the scanning mechanism (118), scanning occurs as in a conventional flatbed scanner and transfer of the signal continues as described above.

The invention claimed is:

1. A method for biometric enrollment and authentication of a user, the method comprising the steps of:
    (a) providing an electro-optic scanner with a planar platen;
    (b) first placing a user's hand on the planar platen and first scanning the underside of the user's hand;
    (c) collecting an enrollment image from the underside of the user's hand,
    (d) detecting a plurality of prominent lines within the contour of the said enrollment, said prominent lines meeting a previously defined minimum for width;
    (e) storing said enrollment image thereby enrolling the user prior to the biometric authentication;
    (f) second scanning said user's hand while collecting an authentication image from solely a portion the user's hand; and
    (g) detecting a plurality of prominent lines within said portion thereby comparing the prominent lines of said authentication image to the corresponding prominent lines within a portion of said enrollment image, thereby performing the authentication.

2. The method of claim 1, wherein said prominent lines include deep lines underneath a joint of a finger.

3. The method of claim 2, further comprising the step of
    (h) measuring a distance between said deep lines underneath said joint of said finger.

4. The method of claim 1, further comprising the authentication of the user, subsequent to said (e) storing, the authentication comprising the step of:
    (h) instructing the user how to place said user's hand on a planar platen and second placing the user's hand on a planar platen.

5. The method of claim 4, wherein said instructing includes a specific movement of the fingers.

6. The method of claim 4, further comprising the step of
    (i) checking if said instructing is followed by the user, and if not followed by the user, terminating the method without the authentication of the user.

7. The method of claim 1, wherein said instructing includes at least one instruction selected from the group consisting of: which hand to use; at what angle relative to said electro-optic scanner to place the hand; whether to open or close the fingers; to which fingers pressure is applied; which area of said scanner to place the hand.

8. The method of claim 1, wherein said second placing is performed by freely positioning the user's hand with any two fingers of the user's hand selectably either open or closed.

9. The method of claim 8, wherein upon said freely positioning of the user's hand, said collecting of authentication image is performed relative to reference points found of the user's hand during said collecting of enrollment image.

10. The method of claim 9, further comprising the step of
    (i) segmenting said enrollment image and said authentication image into a plurality of image segments of a finger and a palm, wherein said segmenting is based on said reference points.

11. The method of claim 1, wherein said comparing of said authentication image to said corresponding portion of said enrollment image includes:
   (i) a comparison of contour of at least said portion of the user's hand
   (ii) a comparison of said prominent lines on the fingers, and
   (iii) a comparison of the prominent lines of the palm in the portion of the hand.

12. The method of claim 1, wherein said first scanning and said second scanning are performed in color and a green background is used above said user's hand for improved contrast.

13. The method of claim 1, wherein said second scanning is performed at resolution less than six hundred dots per inch (DPI).

14. A system comprising a computer operatively connected to a server over a network, wherein at least one of the server or the computer performs the enrollment according to the method of claim 1.

15. A computer readable medium tangibly embodying a set of instructions for programming a computer for performing biometric authentication according to the method steps of claim 1.

16. The method of claim 1, wherein said portion is randomly selected prior to said second scanning.

17. A method for biometric enrollment and authentication of a user, the method comprising the steps of:
   (a) providing an electro-optic scanner with a planar platen;
   (b) first placing a user's hand on the planar platen and first scanning the underside of the user's hand;
   (c) collecting an enrollment image from the underside of the user's hand, said enrollment image including:
      (i) the contour of the hand including both palm and fingers,
      (ii) form of at least one of a plurality of prominent lines of the fingers and the palm;
      wherein said prominent lines of the fingers and said prominent lines of the palm meet previously defined minimum for width;
   (d) measuring a distance between a plurality of prominent lines of the fingers, said prominent lines being deep lines underneath a joint of a finger; and
   (e) storing said enrollment image and said distance thereby enrolling the user prior to the biometric authentication;
   (f) second scanning said user's hand while collecting authentication image from solely a portion the user's hand; and
   (g) comparing said authentication image to a corresponding portion of said enrollment image.

18. The method of claim 17, further comprising the authentication of the user, subsequent to said (e) storing, the authentication comprising the steps of:
   (h) instructing the user how to place said user's hand on a planar platen and second placing the user's hand on a planar platen.

19. The method of claim 18, further comprising the step of
   (i) checking if said instructing is followed by the user, and if not terminating the method without the authentication of the user.

20. The method of claim 17, wherein said portion is randomly selected prior to said second scanning.

21. A computer readable medium tangibly embodying a set of instructions for programming a computer for performing biometric authentication according to the method steps of claim 17.

* * * * *